United States Patent
Kemnitz et al.

(10) Patent No.: US 12,466,229 B2
(45) Date of Patent: Nov. 11, 2025

(54) HYDRAULICS CONSTRUCTION KIT

(71) Applicant: RAPA Automotive GmbH & Co. KG, Selb (DE)

(72) Inventors: Rocco Kemnitz, Selb (DE); Tim Rubitzko, Selb (DE); Johannes Greim, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 0 days.

(21) Appl. No.: 18/594,670

(22) Filed: Mar. 4, 2024

(65) Prior Publication Data

US 2024/0326544 A1    Oct. 3, 2024

(30) Foreign Application Priority Data

Mar. 27, 2023 (DE) .......................... 102023107610.8

(51) Int. Cl.
| | | |
|---|---|---|
| B60G 17/08 | (2006.01) | |
| B60G 13/08 | (2006.01) | |
| F04C 2/08 | (2006.01) | |
| F15B 15/18 | (2006.01) | |
| F15B 21/00 | (2006.01) | |

(52) U.S. Cl.
CPC ............ B60G 17/08 (2013.01); B60G 13/08 (2013.01); F04C 2/084 (2013.01); F15B 15/18 (2013.01); F15B 21/008 (2013.01); *B60G 2202/24* (2013.01); *B60G 2204/62* (2013.01); *B60G 2206/41* (2013.01); *B60G 2500/104* (2013.01); *B60G 2600/182* (2013.01); *B60G 2800/162* (2013.01); *B60G 2800/916* (2013.01); *F04C 2240/40* (2013.01)

(58) Field of Classification Search
CPC ............................ B60K 17/105; B60G 17/056
See application file for complete search history.

(56) References Cited

U.S. PATENT DOCUMENTS

| | | | |
|---|---|---|---|
| 11,590,819 B2 * | 2/2023 | Letizio | ............... B60G 17/0523 |
| 2021/0387500 A1 * | 12/2021 | Letizio | ............... B60G 17/0565 |
| 2024/0416711 A1 * | 12/2024 | Lörcher | ............. B60G 17/0152 |

FOREIGN PATENT DOCUMENTS

| | | | | |
|---|---|---|---|---|
| CN | 112193009 A | * | 1/2021 | ............. B60G 13/14 |
| CN | 115111133 A | | 9/2022 | |
| CN | 118582385 A | * | 9/2024 | ............. B60G 13/08 |
| DE | 10047166 A1 | * | 4/2001 | ............. F04B 1/2064 |
| DE | 102005010297 A1 | * | 10/2006 | ........... B60G 17/056 |
| DE | 102010007237 A1 | | 9/2010 | |
| DE | 102017216919 A1 | | 3/2019 | |

(Continued)

OTHER PUBLICATIONS

Office Action issued on Mar. 21, 2024, in corresponding German Application No. 10 2023 107 610.8, 14 pages.

(Continued)

*Primary Examiner* — Nicole T Verley
(74) *Attorney, Agent, or Firm* — Maier & Maier, PLLC

(57) ABSTRACT

A hydraulic system for an active chassis, including a motor-pump group with a pump casing with a mounting section with integrated fluid interface with first and second fluid openings, and a load with a casing with corresponding mounting section and corresponding fluid interface. The load can be mounted on the pump casing in such a manner that the fluid openings are disposed mutually opposite.

20 Claims, 6 Drawing Sheets

(56) References Cited

FOREIGN PATENT DOCUMENTS

| DE | 102018115177 B3 | | 7/2019 | |
|---|---|---|---|---|
| DE | 102018122226 A1 | | 3/2020 | |
| DE | 102021105032 A1 | * | 9/2022 | ............. B60G 13/00 |
| DE | 102023005421 A1 | * | 12/2024 | ......... B60G 17/0152 |
| EP | 3764522 A1 | * | 1/2021 | ............. B60G 13/14 |
| JP | S6181854 A | * | 4/1986 | |
| JP | 4172974 B2 | * | 10/2008 | ............. A61G 15/02 |
| JP | 2020034022 A | * | 3/2020 | ................ E02F 9/22 |
| JP | 7201365 B2 | * | 1/2023 | ................ E02F 9/22 |
| KR | 1020200138958 A | | 12/2020 | |
| WO | WO-2021253044 A1 | * | 12/2021 | ........ B60G 17/0155 |
| WO | WO-2023031566 A1 | * | 3/2023 | ............. F04B 17/03 |

OTHER PUBLICATIONS

Extended Search Report issued on Sep. 9, 2024, in corresponding European Application No. 24165876.4, 20 pages.

* cited by examiner

HYDRAULICS CONSTRUCTION KIT

FIELD

The present invention relates to a hydraulic system for an active chassis of a vehicle, an axle set and a construction set therefor and a chassis axle and a chassis system with such a hydraulic system.

BACKGROUND

Active chassis systems are known, for example, from DE 39 02 743 C1 or DE 2 020 292 A1. A distinction is made here, for example, between completely active and semi-active chassis systems, in which the suspension can be regulated actively either for each wheel individually or per axle. An active chassis has hydraulically controllable shock absorbers, in which the two cylinder or shock absorber chambers of the working cylinder of a shock absorber are not merely interconnected via one or several, possibly controllable damping or throttle valves, but in which, for example, the filling state of the cylinder chambers can be controlled actively, and correspondingly hydraulic forces can be guided as needed into the chassis. The two cylinder chambers of a shock absorber can be connected, for example, parallel or alternatively to the damping valves or throttle valves, via a hydraulic pump that can be driven by an electric motor, or can drive said electric motor then working as an electric generator or electric motor generator (recuperation operation). Additionally or alternatively, also other settings can be effected in the shock absorber with the aid of the pump.

By pumping hydraulic fluid it is possible, for example, to counteract pitching or rolling motions of the vehicle thereby. Conversely, such an arrangement of shock absorber, hydraulic pump and electric motor can also feed electric energy obtained by recuperation back into the on-board network of the vehicle. Further, when employing the pump, different damping behaviors can be set, for example "soft" or "hard" or also in dependence on the driving behavior and/or the road surface conditions.

The hydraulic pump and the electric motor generator or electric motor are thus generally employed in the active chassis for guiding hydraulic energy in or out. The pump and the electric motor usually form a common, compact construction unit here, which will be referred to as motor-pump group in the following. When there is further arranged an electric drive unit or regulation unit on the motor-pump group, this is also referred to in the following as a motor-pump unit (MPU).

It is advantageous here when the motor-pump group or the motor-pump unit is arranged in spatial proximity to a load, i.e. the shock absorber or another hydraulic element optionally placed upstream. However, this is not always possible with respect to construction space and usually requires adaptations on the hydraulic system of motor-pump group/motor-pump unit and load.

SUMMARY

It is the object of the invention to state a hydraulic system for an active chassis of a vehicle, which can be adapted with little effort to different construction space requirements. It is a further object of the invention to state a corresponding construction set for this as well as a chassis system with such a hydraulic system.

The hydraulic system according to the invention for an active chassis comprises a motor-pump group and a load. The motor-pump group comprises a hydraulic pump and an electric motor, in particular an electric motor generator, which are fixedly interconnected, for example via a motor shaft, and is based on the known motor-pump groups. The motor-pump group further comprises a pump casing, which forms that section or portion of a single-part or multi-part motor-pump casing which accommodates/encloses the pump or immediately adjoins thereto. The pump casing forms or comprises, for example, a pump lid of a multi-part motor-pump casing, which preferably (completely) encloses the pump on an axial front side or forms the axial front side of the motor-pump casing. Through the axial front side there extends the axis or the extension of a motor shaft of the motor-pump group. The axial front side usually extends normally or substantially normally to the motor shaft axis and/or is configured to be substantially or completely planar in the simplest case.

The pump casing of the motor-pump groups has (exactly) one mounting section for the (mechanically stable) attachment or mounting of an external component or load on the pump casing. The mounting section, which forms a section of the outer side of the pump casing or is arranged on the outer side of the pump casing, is preferably arranged on the axial front side of the pump casing, particularly preferably exclusively on the axial front side of the motor-pump casing, and/or forms the axial front side of the motor-pump casing. Instead of exactly one mounting section, it is also conceivable to provide several e.g. two, three or four mounting sections on the outer side of the pump casing, which are respectively mutually spaced apart, for example.

According to the invention, a fluid interface for a hydraulic fluid is integrated in the mounting section, i.e. the fluid interface is located within the mounting section, for example within a border of the mounting section. The fluid interface has at least or exactly one first and one second fluid opening here.

The load of the hydraulic system according to the invention likewise comprises a single-part or multi-part casing. Said load casing has a mounting section that corresponds to the mounting section of the pump casing. The mounting section of the load or of the load casing has a fluid interface corresponding to the fluid interface of the pump casing, with a first and a second fluid opening, which is correspondingly likewise integrated in the mounting section of the load casing.

According to the invention, the load can be mounted via the respective mounting sections as the external component on the pump casing of the motor-pump group, in such a manner that the first fluid openings of the two fluid interfaces and the second fluid openings of the two fluid interfaces are disposed immediately or directly opposite each other.

Thereby the hydraulic fluid can flow with little resistance between the motor-pump group and the load when the load is mounted on the motor-pump group, and it is possible to couple the two fluid interfaces in different manners.

Preferably, all first and second fluid openings are configured identically, have the same diameter and/or are circular or cylindrical bores the central axes of which extend parallel to the motor-shaft axis.

The hydraulic system according to the invention serves preferably for guiding in and/or out hydraulic energy, into the load or via the load into a downstream system, such as, for example, a shock absorber, or out from there.

In a preferred embodiment the hydraulic system further comprises hydraulic coupling means for creating a fluid-tight hydraulic connection between respectively the first hydraulic openings and the second hydraulic openings of the motor-pump group and of the load.

The coupling means comprise or consist of, for example, at least one or exactly two O-rings, which are set up, when the load is attached on the motor-pump group between the pump casing and the casing of the load, for being clamped, in the simplest case, immediately by the two casings (pump casing and load casing) or the corresponding mounting sections of the two casings. For this purpose the O-rings have a diameter which is greater than the diameter of the fluid openings and/or are set up for being arranged concentrically around the fluid openings. Preferably, the mounting sections (preferably configured as a flange) each have a concentric depression for an O-ring around the fluid openings. Correspondingly, the O-rings are set up for forming an axial seal at the fluid openings.

In a variant the coupling means comprise or consists of at least one or exactly two preferably (completely) cylindrical coupling adapters or plug-in adapters, each of which having two radial sealing rings on the outer side. The coupling adapters are pluggable partially, preferably by half, into respectively mutually opposite fluid openings, so that respectively one radial sealing ring engages on an inner side of the fluid opening, into which the adapter is plugged partially or by half. The adapters are correspondingly set up to form a radial seal on or in the fluid openings.

The coupling means in the form of O-rings and/or coupling adapters are thus set up to create a sealed hydraulic connection between the load and the motor-pump group when the load is attached on the motor-pump group in the respective mounting sections.

Alternatively, the coupling means comprise or consist of two (for example self-supporting and/or rigid or flexible) hydraulic or fluid lines (hose lines, hoses, etc.) the four (usually identically configured) line ends of which are provided for fluid-tight attachment or mounting on the fluid openings.

In a first variant a (n axial) line end has a plug-in section which is pluggable into a fluid opening. The plug-in section of the line end is preferably configured cylindrically and/or has respectively one or two radial sealing rings on its outer side. In the simplest case, the plug-in section is configured as an above-described coupling adapter or one half thereof. Correspondingly, the line end or its plug-in section is set up to form a radial seal on or in a given fluid opening.

In a second variant a line end has a fluid opening into which an above-described coupling adapter or one half thereof can be plugged. Correspondingly, the coupling or plug-in adapter creates a radial seal on or in the respective fluid opening.

In a third variant one line end has a fluid opening and a flange surrounding the fluid opening. The coupling means further comprise an above-described O-ring, which is arranged concentrically around the fluid opening and is clamped between the flange of the line end and the mounting section (preferably configured as a flange) of the pump or load casing. Preferably, the mounting section of the pump or load casing and the flange of the line end respectively have a concentric depression for the O-ring around the fluid opening, which are disposed mutually opposite.

The line ends preferably further have mounting means for their mechanical mounting on the mounting sections of the load and the motor-pump group (pump and/or load casing), so that the line ends or fluid openings of the hydraulic or fluid lines and the fluid openings in the mounting sections of the load and the motor-pump group are disposed mutually opposite. The two fluid lines are preferably configured as a double hose. Further, preferably all (four) line ends of the two hydraulic or fluid lines are configured identically.

The coupling means in the form of two fluid lines are thus set up to create a sealed hydraulic connection between the load and the motor-pump group on the respective mounting sections or the respective fluid interfaces when the load is arranged remotely from the motor-pump group.

In a preferred embodiment of the hydraulic system the mounting section of the motor-pump group and/or load are configured as corresponding flanges, preferably with identical dimensions or outer dimensions. Correspondingly, the mounting sections have corresponding planar area sections, on which the mounting sections mutually engage areally or abut on each other when the load is attached on the motor-pump group. For example, the mounting sections each have a continuously circumferential, planar rim (i.e. with a constant height or stepless), whereby a very high mechanical stability of the mounting of the load on the pump casing can be achieved.

The mounting sections are preferably planar flanges, meaning that they consist substantially of a planar area. For example, a planar flange consists of one single planar area with a constant height, which is interrupted exclusively by the integrated fluid interface, i.e. the two fluid openings and, optionally, by (corresponding) threaded or screw holes for mounting the load on the motor-pump group and/or for mounting coupling means on the mounting sections.

The mounting section of the motor-pump group preferably has a plurality of threaded holes and the mounting section of the load has the same plurality of corresponding screw holes. The load can be screwed to the motor-pump group correspondingly. Further, both mounting sections have one, two or more further threaded holes for mounting (the mounting means) of the line ends of the fluid lines. The two fluid openings and the optionally provided threaded and/or screw holes are preferably integrated in the flanges here, i.e. they are enclosed completely by the respective flange, for example by the respective planar area thereof. Particularly preferably the flange on the pump casing of the motor-pump group is configured normally to the motor shaft axis.

The hydraulic system is further preferably configured such that the load can be mounted on the motor-pump group exclusively via the mounting sections thereof. The flanges correspondingly form mounting flanges which have a sufficiently high mechanical stability.

In a preferred embodiment of the hydraulic system the load is a hydraulically controllable shock absorber or a valve block.

The valve block is preferably a compact construction unit here and/or has a closed casing and comprises, for example, one, two, three, four or several hydraulic construction groups or construction units (which are usually arranged on the inside of the casing) and/or two, four, six, eight or several hydraulic connectors (which are preferably arranged on the outer side of the casing). The construction groups can respectively be configured as active and/or passive construction groups, in particular as active and/or passive valves. For example, a construction group is configured as a switch valve, regulating valve, pressure-regulating valve, throttle valve (passive or active), check valve, safety valve (overpressure limitation, passive), direction valve (switch valve), fluid filter, flow divider or track switch (passive) and/or hydraulic pressure or fluid storage (hydraulic fluid storage).

Further, the hydraulic connectors form hydraulic outflows, for example to the motor-pump group, and/or to one, two or several subordinate loads, such as actuators, (hydraulically controllable) shock absorbers and/or hydraulic fluid storages, and/or the hydraulic connectors are set up therefor.

A load in the form of a valve block generally expands the functionality of the hydraulic system, for example the valve block adds a pressure-regulating function to the motor-pump group as a volume flow regulator/supplier, and/or the valve block guides the hydraulic fluid flow of the motor-pump group to a multiplicity of subordinate loads in targeted manner, in particular with the aid of passive and/or active or controllable valves, and/or the valve block regulates at least or exactly one or two internal or external hydraulic fluid storages, for example to create a volume balance in the hydraulic system, in order to balance, for example, fluid movement through pressure surges on a load, in particular a shock absorber, or through other highly dynamic requirements/stresses and/or through thermal influence, and/or the valve block makes available a hydraulic basic function in the event of a failure of the motor-pump unit (failsafe functionality) and thus fulfills a safety-relevant function.

The electric motor or electric motor generator of the motor-pump group is preferably a brushless, permanently excited synchronous motor, in particular three-phase synchronous motor, with preferably exactly three motor-phase supply lines. The electric motor is further preferably a rotational-speed variable drive which can be operated as an actuator motor and is set up and provided for moving towards and/or holding in targeted manner predetermined settings or positions. The electric motor is further preferably a bidirectional drive, which can be operated in both rotational directions, and particularly preferably also is four-quadrant enabled, i.e. it can be operated also as an electric generator in both rotational directions (electric motor generator).

The hydraulic pump of the motor-pump group is preferably a gear pump, particularly preferably an internal gear pump. These are preferably leakage-compensated, i.e. they have only small and/or negligible leakages, so that the conveyed amount of hydraulic fluid is fixedly coupled to the rotation circumference (high volumetric degree of efficiency). Correspondingly, the motor-pump group can preferably be operated as an actuator pump or actuator drive for the load and is set up and provided to move towards in targeted manner and to hold predetermined hydraulic settings or positions of the load. A motor-pump group with a leakage-compensated internal gear pump for reversing operation is known, for example, from DE 10 2014 103 958 A1, the disclosure content of which is included in the disclosure content of the present description, in particular with respect to the configuration of the internal gear machine (axial sealing disks, radial sealing elements, etc.).

The hydraulic system further comprises preferably an electronic unit for the electric regulation and for the electric supply or the electric drive of the motor of the motor-pump group. In the simplest case the electronic unit delivers directly and immediately the or all coil currents or motor-phase currents for the electric motor of the motor-pump group, and/or the motor-pump group, for example, does not have any electric switching components and/or any electronic or integrated components within the motor-pump casing, and/or the electronic unit is electrically connected to the electric motor of the motor-pump group exactly or at least via three (single-core) motor-phase lines or magnetic-coil supply lines.

Further, the motor-pump group and the electronic unit (or the motor-pump unit formed thereby) are preferably arranged in a common casing or motor-pump unit casing, which is in particular a multi-part common casing, which is joined from exactly or at least the motor-pump casing (in which the motor-pump group is received preferably completely) and a casing of the electronic unit or an electronic lid (in which the electronic unit is received preferably completely). The electric lines between the electronic unit and the motor-pump group or its electric motor preferably extend completely within the motor-pump unit casing. Further, the common motor-pump unit casing preferably forms a closed, sealed casing, which is sealed against soiling and other environmental influences, for example airtight, waterproof or splash-waterproof, with the hydraulic system thus being installable on a lower side of a vehicle. The common casing further preferably is also sealed or shielding against electromagnetic radiation, which is generated, for example, due to high alternating currents in the electric motor, in order to minimize or reduce the EMC exposure. The common motor-pump unit casing preferably comprises, on its outer side or on the outer side of the electronic lid, exactly one bus interface as an electric interface (e.g. for a CAN bus or a LIN bus) and exactly one supply voltage interface, in particular for a high voltage of, for example, 400 V or 800 V.

The invention further relates to an axle set or a motor-pump unit axle set comprising, in a first alternative, (exactly) two hydraulic systems as described above. The axle set preferably comprises a common electronic unit for the motor-pump groups or the electric motors of both hydraulic systems. The common electronic unit is set up here for the independent electric regulation and electric supply or the electric drive of the electric motors of both motor-pump groups.

In the simplest case, the common electronic unit delivers directly and immediately the or all coil currents or motor-phase currents for the electric motors of both motor-pump groups, and/or the motor-pump groups do not have, for example, any electric switching components and/or any electronic or integrated components within the respective motor-pump casings, and/or the common electronic unit is electrically connected to the two electric motors of the two motor-pump groups exactly or at least via respectively three (single-core) motor-phase lines or magnetic-coil supply lines.

Further, the two motor-pump groups and the common electronic unit (or the motor-pump unit axle set formed thereby) are preferably arranged in a common casing or axle-set casing, which is, in particular, a multi-part common casing, which is joined from exactly or at least the two motor-pump casings (in which the motor-pump groups are respectively received preferably completely) and a casing of the common electronic unit or the electronic lid (in which the common electronic unit is received preferably completely). The electric lines between the common electronic unit and the two motor-pump groups or their electric motors preferably extend completely within the axle set casing here. Further, the common axle set casing forms preferably a closed, sealed casing, which is sealed against soiling and other environmental influences, for example airtight, waterproof or splash-waterproof, with the axle set thus being installable on a lower side of a vehicle. The common axle set casing is further preferably also sealed or shielding against electromagnetic radiation, which is generated, for example, due to high alternating currents in the electric motors, in order to minimize or reduce the EMC exposure. The axle set casing preferably comprises on its outer side or on the outer side of the electronic lid, exactly one bus interface as an electric interface (e.g. for a CAN bus or a LIN bus) and exactly one supply voltage interface, in particular for a high voltage of, for example, 400 V or 800 V.

In a second alternative the axle set comprises (exactly) two hydraulic systems as described above with respective electronic units, wherein preferably the motor-pump group and the electronic unit of both hydraulic systems is configured respectively as a motor-pump unit and/or arranged in respective motor-pump unit casings. The motor-pump units are preferably fixedly interconnected, preferably screwed to each other or mounted on a common mounting plate and/or arranged in a common casing.

In a preferred embodiment of the axle set the first hydraulic system comprises as coupling means two O-rings (as described above) or coupling adapters, and the second hydraulic system comprises as coupling means two fluid lines (as described above). The first hydraulic system is thus set up to create a sealed hydraulic connection between the load and the motor-pump group when the load is attached immediately on the motor-pump group on the respective mounting sections. The second hydraulic system, in contrast, is set up to create a sealed hydraulic connection at the respective mounting sections between the load and the motor pump group when the load is arranged remotely from the motor-pump group.

The invention further relates to a construction kit, comprising in a first variant (exactly) one hydraulic system as described above and a coupling means in the form of two fluid lines and a coupling means in the form of two O-rings and/or two coupling adapters. The construction set thus contains all required coupling means for the selective attachment of the load directly on the motor-pump group or for the remote arrangement of the load.

In a first variant, the construction kit comprises (exactly) one axle set as described above and two coupling means in the form of respectively two fluid lines and two coupling means in the form of respectively two O-rings and/or two coupling adapters. The construction set thus contains the required coupling means for both hydraulic systems for the selective attachment of the load directly on the motor-pump group or for the remote arrangement of the load.

The construction set according to the invention thus creates a hydraulic system and/or an axle set which can be adapted flexibly to different or changing construction space situations.

In a preferred embodiment of the hydraulic system, the load is mounted on the mounting section of the motor-pump group and coupling means in the form of two O-rings or two coupling adapters create a hydraulic connection between the motor-pump group and the load. The load is mounted on the motor-pump group preferably exclusively via the corresponding mounting sections.

Alternatively, the load is arranged remotely from the motor-pump group and coupling means in the form of two fluid lines create a hydraulic connection between the motor-pump group and the load. The line ends of the fluid lines have mounting means here, which are mounted on the mounting sections of the motor-pump group and the load, in particular are screwed into threaded holes provided for this purpose.

In a preferred embodiment of the axle set, in the first and the second hydraulic system the load is mounted on the mounting section of the motor-pump group and coupling means in the form of two O-rings or two coupling adapters create a hydraulic connection between the motor-pump group and the load. The load in the first and the second hydraulic system is mounted to the respective motor-pump group preferably exclusively via the corresponding mounting sections.

Alternatively, in the first and the second hydraulic system the load is arranged remotely from the motor-pump group and coupling means in the form of two fluid lines create a hydraulic connection between the motor-pump group and the load. In the first and the second hydraulic system the line ends of the fluid lines have mounting means here, which are mounted on the mounting sections of the motor-pump group and the load, in particular are screwed into threaded holes provided for this purpose.

Further alternatively, in the first hydraulic system the load is mounted on the mounting section of the motor-pump group and coupling means in the form of two O-rings or two coupling adapters create a hydraulic connection between the motor-pump group and the load. The load in the first hydraulic system is mounted on the motor-pump group preferably exclusively via the corresponding mounting sections. Further, in the second hydraulic system the load is arranged remotely from the motor-pump group and coupling means in the form of two fluid lines create a hydraulic connection between the motor-pump group and the load. In the second hydraulic system the line ends of the fluid lines have mounting means here which are mounted on the mounting sections of the motor-pump group and the load, in particular are screwed into threaded holes provided for this purpose.

A chassis system according to the invention or a chassis axle for a vehicle according to the invention comprises at least a first and second hydraulically actively controllable shock absorber with respectively two damper or pressure chambers, for example separated by a movable damper piston, said chamber being preferably allocated to or arranged on one common chassis axle, as well as at least a first and a second hydraulic system as described above or an axle set as described above, wherein the motor-pump group or the load or valve block of the first hydraulic system hydraulically interconnects the pressure chambers of the first shock absorber and the motor-pump group or the load or valve block of the second hydraulic system hydraulically interconnects the pressure chambers of the second shock absorber. Thereby, for example a "soft" or "hard" damping can be set, by the respective motor-pump group damping or throttling, for example, pressure surges from the pressure chambers to a greater or lesser degree. In this case, the respective motor-pump group is thus driven hydraulically, so that the electric motors of the motor-pump groups can be operated as electric motor generators and thus electric energy can be recuperated (recuperation). Alternatively, pressure surges from the pressure chambers can also be damped or throttled by the passive and/or active construction groups and/or valves in the load or valve block. Further, also the zero position or rest position of the shock absorber can be set actively or in targeted manner and can also be changed (continually) during the driving operation (active chassis). The system in question here is preferably a closed hydraulic system in each case, in which, for example, no pressureless tank is provided. It is understood that the chassis system can have one or several further axles preferably configured likewise.

BRIEF DESCRIPTION OF THE DRAWINGS

The invention will hereinafter be described by way of example with reference to the attached drawings. The drawings are merely schematic representations and the invention is not limited to the specific represented embodiment examples.

DETAILED DESCRIPTION

Figure 1:
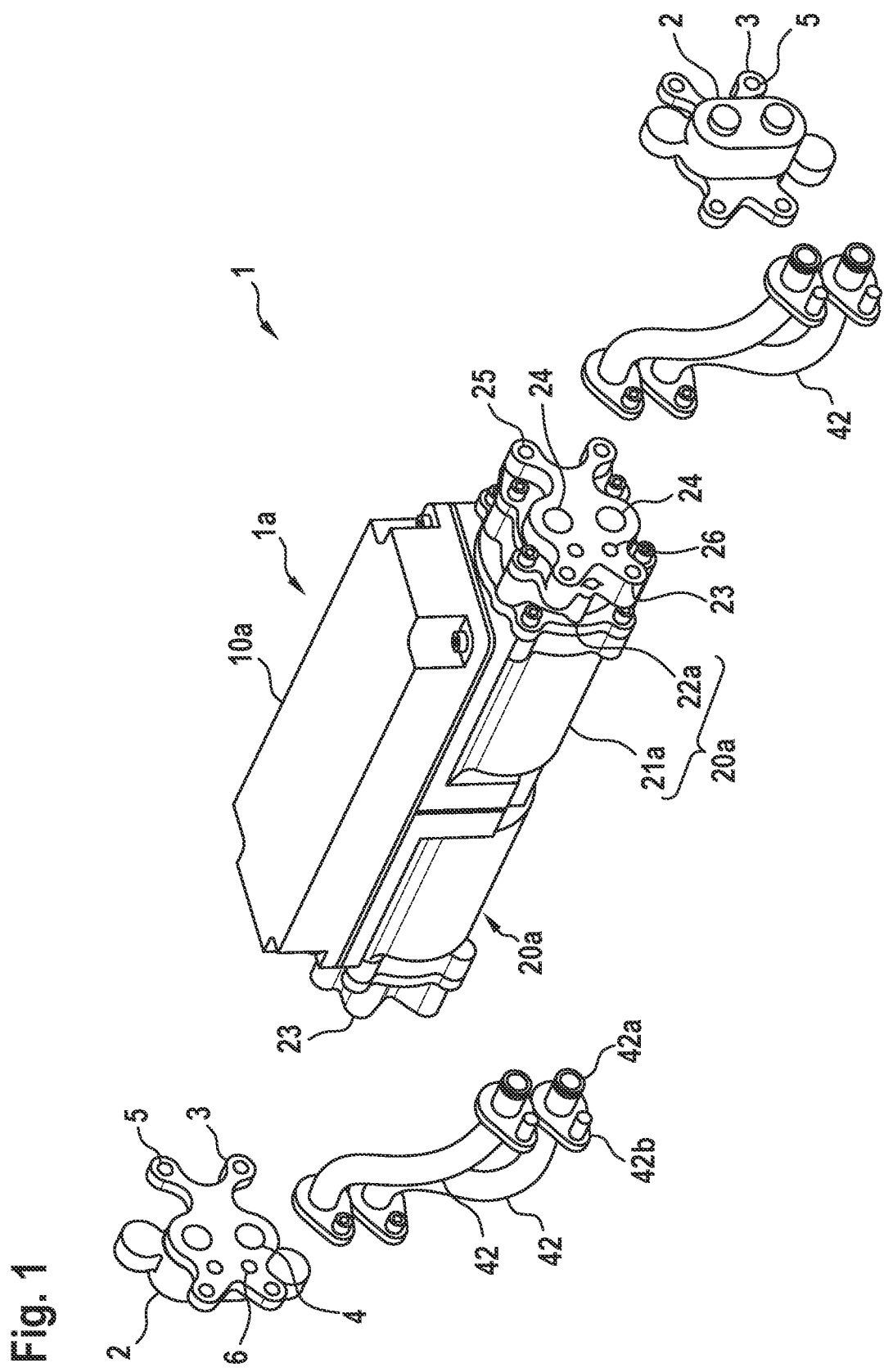
FIG. 1 shows a perspective view of a motor-pump axle set with two valve blocks according to a first embodiment example.
Figure 2:
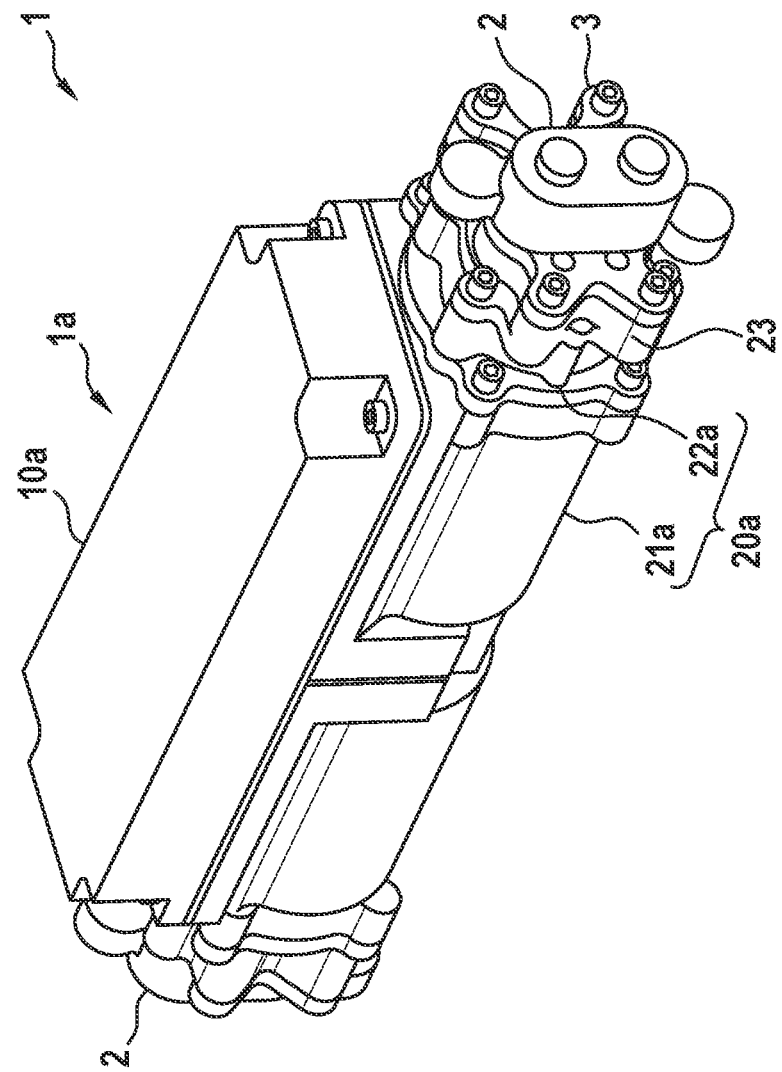
FIG. 2 shows a perspective view of a motor-pump axle set with two valve blocks according to a second embodiment example.

FIGS. 1 and 2 represent perspective views of two different embodiment examples or connection variants of an axle set or MPU axle set 1.

The axle set 1 comprises a first and a second motor-pump group 20, a common electronic unit 11 and two valve blocks 2. In both embodiment examples the two motor-pump groups 20 and the common electronic unit 11 are arranged in a closed, multi-part axle set casing 1a here, which consists of an electronic lid 10a (which accommodates the common electronic unit 11) and two motor-pump casings 20a (which accommodate one motor-pump group 20 each). Each of the motor-pump casings 20a consists of a motor casing 21a and a pump casing 22a, which accommodate an electric motor or electric motor generator 21 and a pump 22, respectively. On the pump casing 22a, which is arranged on the axial front side of the motor-pump casing 20a close to the pump, there is located a mounting flange 23 for mounting an external apparatus, for example a valve block 2, as represented in the embodiment example of FIG. 2, wherein the valve block 2 has a corresponding mounting flange 3 for this purpose. Into the mounting flanges 3, 23, there are integrated respective fluid interfaces, which presently consist of two fluid openings 4, 24 each.

Figure 3:
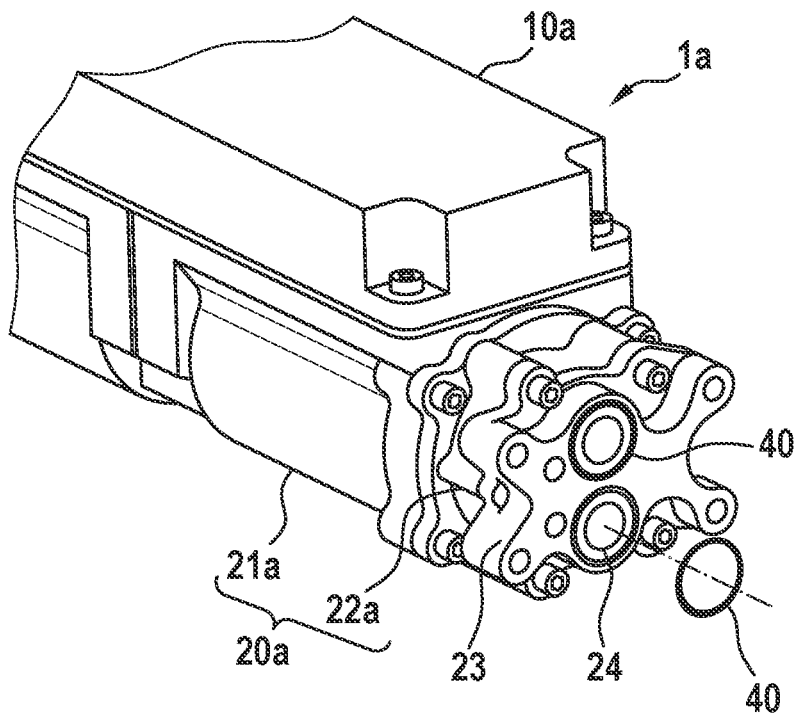
FIGS. 3 and 4 show a perspective view of a mounting flange with coupling means.

In the embodiment example represented in FIG. 2, in which the valve blocks 2 are flange-mounted on the pump casing 22a, the O-rings 40 represented in FIG. 3 are employed as hydraulic coupling means in a first variant, for forming a fluid-tight connection between the motor-pump group 20 and the valve block 2. The two O-rings 40 are arranged respectively concentrically around the fluid openings 4, 24 and are clamped between the two mounting flanges 3, 23 when the valve block 2 is mounted, whereby an axial seal is created.

Figure 4:
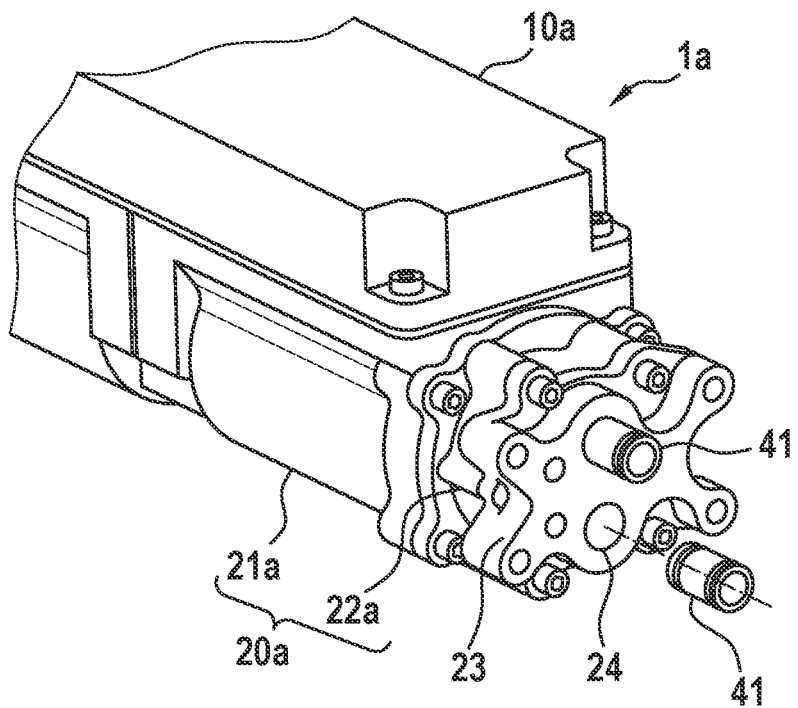

In a second variant represented in FIG. 4 two cylindrical coupling adapters 41 are employed as hydraulic coupling means instead of the O-rings 40, said adapters being plugged into the mutually opposite fluid openings 4, 24 respectively by half and each having a sealing ring on their outer side, which sealing ring is positioned in a fluid opening 4, 24 when the valve block 2 is mounted on the pump casing 22a and creates a radial seal there. In the FIGS. 3 and 4 the coupling means 40, 41 are shown in an exploded view at the fluid opening 4 (the lower one in the Figure).

The mounting flange 23 of the pump casing 22a further comprises in the represented embodiment example four threaded holes 25 which correspond to four screw holes 5 in the mounting flange 3 of the valve block 2 and correspondingly permit the screwing of the valve block 2 to the pump casing 22a represented in FIG. 2.

Moreover, in the represented embodiment examples the two mounting flanges 3, 23 comprise respectively two (further) threaded holes 6, 26 for selectively mounting fluid lines 42. The fluid lines 42—as represented in FIG. 1, for example, have at their line ends cylindrical coupling elements 43 that are pluggable into the fluid openings 4, 24 and have a sealing ring on the radial outer side for creating a radial seal between the fluid opening 4, 24 and the fluid line 42. Moreover, the line ends have mounting means 44, comprising a screw, which corresponds to threaded holes 6, 36 of the mounting flanges 3, 23, whereby the line ends of the fluid lines 42 can be fixed to the mounting flanges 3, 23.

Correspondingly, depending on the construction space requirements, the valve blocks 2—as represented in FIG. 2—can be arranged directly on the axle set 1 or they can be positioned remotely therefrom, as represented in FIG. 1. The hydraulic connection required between the motor-pump groups 20 and the valve blocks 2 is then created via the respectively suitable coupling means in the form of O-rings 40, coupling adapters 41 or fluid lines 42, without requiring any further adaptation on the axle set going beyond this selection of coupling means.

In a not represented embodiment example of the axle set the valve block 2 is mounted on the mounting flange 23 of the pump casing 22a in the first hydraulic system, and as coupling means there are provided two O-rings 40 or two coupling adapters 41. In contrast, the valve block 2 and the motor-pump group 20 are arranged mutually spaced apart in the second hydraulic system, and as coupling means there are provided two fluid lines 42.

Figure 5:
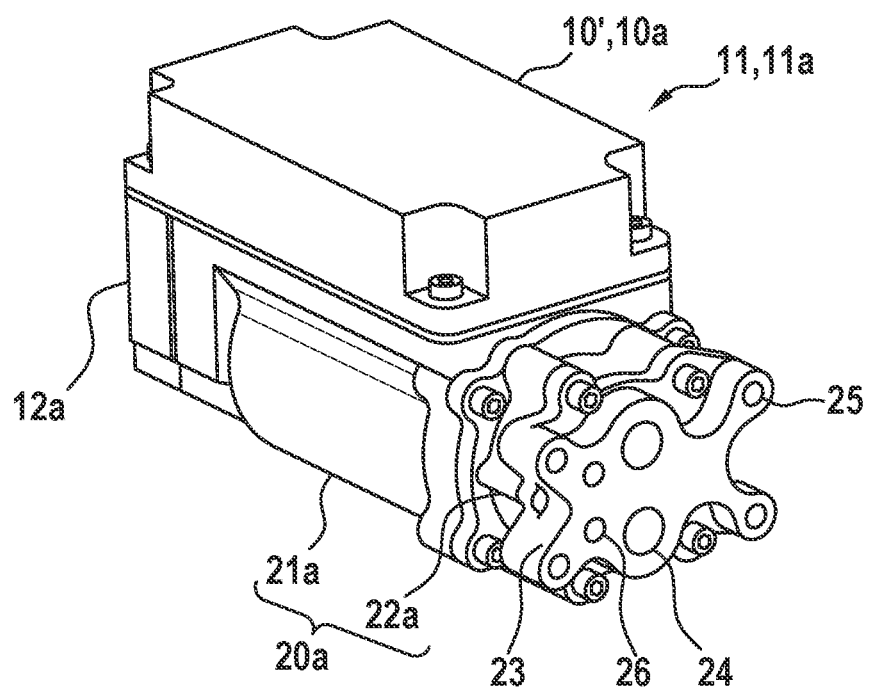
FIG. 5 shows a perspective view of an MPU.

FIG. 5 represents a hydraulic system. Said system comprises exactly one motor-pump group 20, one electronic unit 12 and one valve block 2. The motor-pump group 21 and the electronic unit 12 form an MPU 11 (motor-pump unit) here, and are arranged in a closed, multi-part MPU casing 11a, which consists of an electronic lid 10a (which accommodates the electronic unit 11) and of a motor-pump casing 20a (which accommodates the motor-pump group 20) and in the represented embodiment example further of a further casing lid 12a. The motor-pump casing 20a is configured here as described above in connection with the axle set 1. By suitably selecting the hydraulic coupling means 40, 41, 42, the valve block 2 can correspondingly be selectively directly flanged to the MPU 11 or to the pump casing 22a or can also be arranged spaced apart from the MPU 11 without requiring a further adaptation on the hydraulic system going beyond this selection of coupling means.

Figure 6:
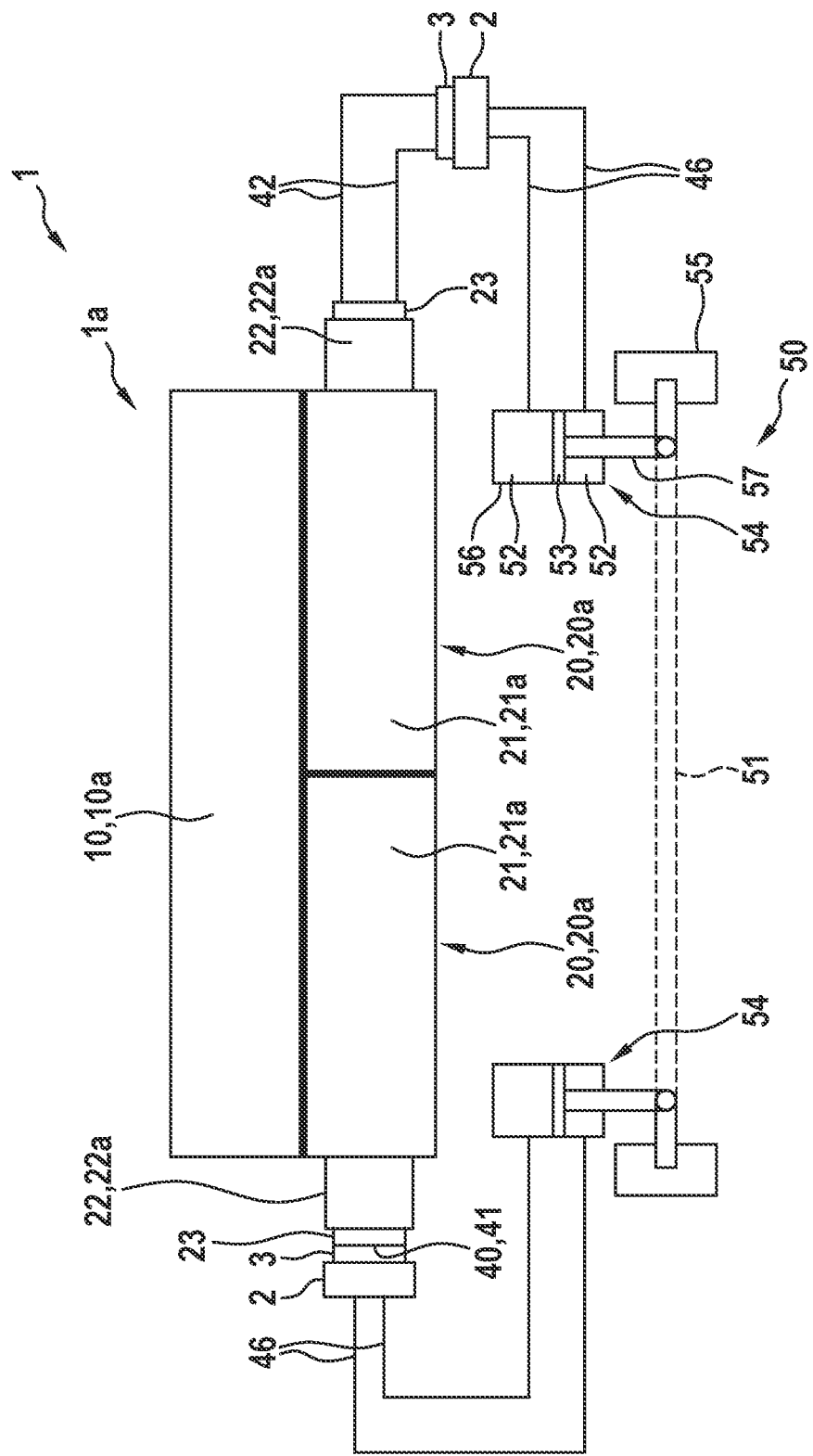
FIG. 6 shows a schematic view of a chassis system with an axle set.

In FIG. 6 a chassis system 50 with an axle set 1 is represented schematically. The pumps 22 arranged in the pump casings 22a of the motor-pump groups 20a are connected via respective valve blocks 2 to the pressure chambers 52 of a shock absorber 54.

In the hydraulic system represented in FIG. 6 on the right side, the valve block 2 is arranged remotely from the pump casing 22a and hydraulically connected to the pump 22 via fluid lines 42, wherein line ends of the fluid lines 42 are mounted on the mounting flanges 3, 23 of the valve block 2 and the pump casing 22a. Between the valve block 2 and the shock absorber 54 there are provided further hydraulic lines 46. In the hydraulic system represented in FIG. 6 on the left side, the valve block 2 is flanged directly to the pump casing 22a via the respective mounting flanges 3, 23. In this hydraulic system not-represented coupling elements (e.g. O-rings 40 or coupling adapters 41) create a fluid-tight hydraulic connection between the pump 22 and the valve block 2, and between the valve block 2 and the shock absorber 54 there are again provided hydraulic lines 46. In a not represented variant the valve block 2 is arranged immediately on the shock absorber 54 and there are provided fluid lines 42 between the valve block 2 and the pump 22.

In the represented embodiment example the valve block 2 (as load) is interposed between the motor-pump group 20 and the shock absorber 54 (as subordinate load) and does not regulate any other subordinate loads. The valve block 2 correspondingly has four hydraulic connectors or fluid openings 4.

Figure 7:
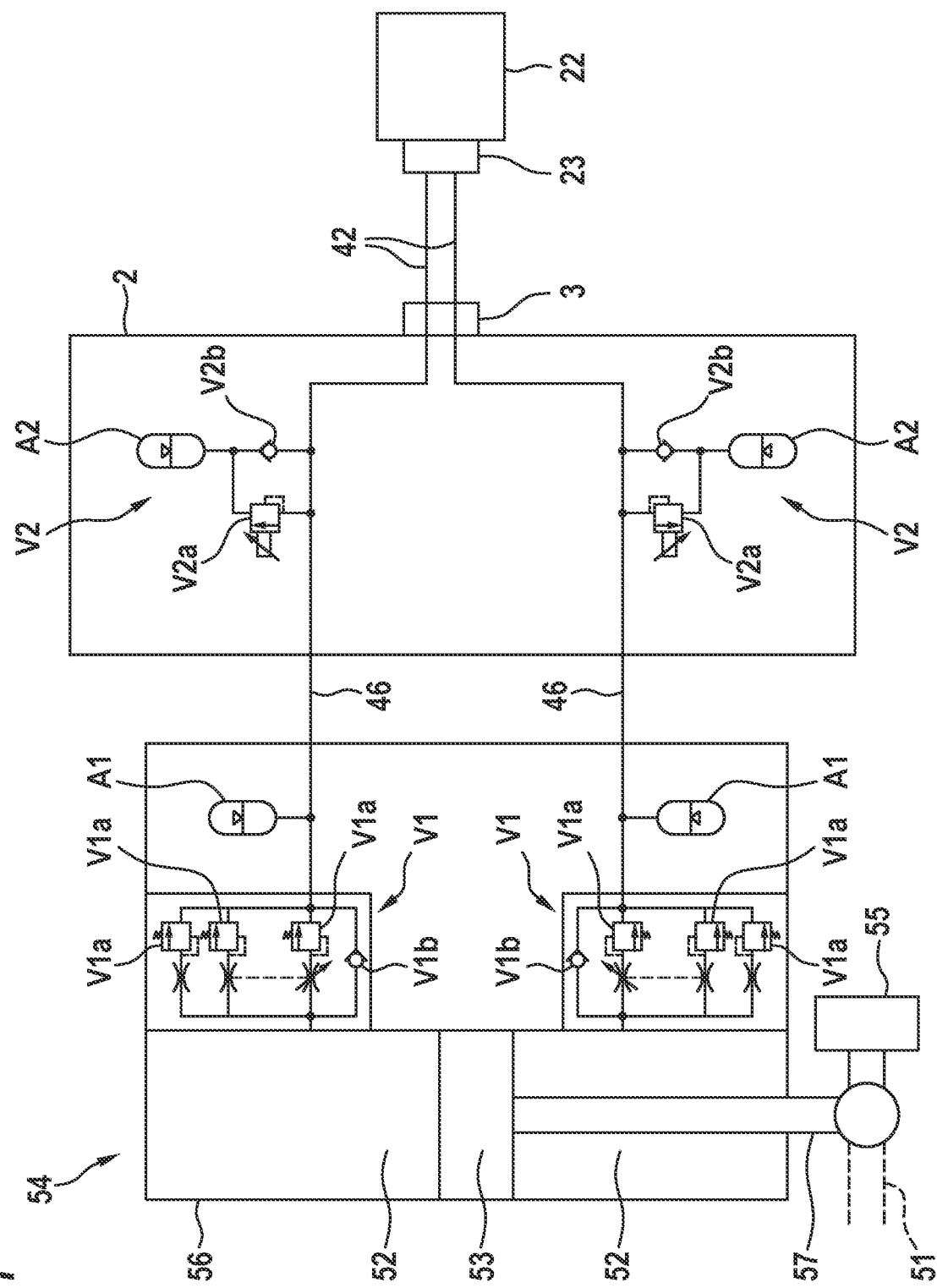
FIG. 7 shows a hydraulic system with shock absorber.

In FIG. 7 the hydraulic system represented in FIG. 6 on the right side is represented at a higher degree of detail and with the (internal) construction groups of the valve block 2 and the shock absorber 54. The hydraulic system here is configured substantially symmetrically and has two hydraulic branches, each of which connect the pump 22 to one of the two pressure chambers 52 of the shock absorber 54. The valve block 2 comprises, within a closed casing, a valve unit V2 and a hydraulic fluid storage A2 for each of these hydraulic branches. The valve unit V2 consists of a variable pressure-limiting valve V2a and a check valve V2b. The shock absorber 54 comprises, likewise within a closed casing, besides the piston 53, the pressure cylinder 56, the piston rod 57 and the two resulting pressure chambers 52, a valve unit V1 and a hydraulic fluid storage A1 for each of the two hydraulic branches of the hydraulic system. The valve unit V1 consists of a flap valve V1a and a check valve V1b. This hydraulic system and its manner of functioning is described in greater detail in the document DE 10 2018 215 037 A1. The disclosure content of the document DE 10 2018 215 037 A1 in total and in particular with respect to the embodiment example of FIG. 2 (paragraphs [0016] to [0070]) is hereby included in the disclosure content of the present document.

In the hydraulic system external disturbances, for example through bumps in the road surface or potholes, can be dampened predominantly with the aid of the valve units V1 and the hydraulic fluid storages A1, while the valve block 2 with the valve units V2 and the hydraulic fluid storages A2 predominantly ensures the supply with hydraulic fluid during the operation of the pump 22.

In a not represented embodiment example the hydraulic fluid storages A1 are arranged externally to or on the valve block 2 and are, for example, mounted or flanged directly on the closed casing of the valve block or are arranged remotely and connected via respectively one hydraulic fluid line.

In the represented embodiment example the cylinders of the shock absorbers 54 are connected with the suspended mass of the vehicle or the chassis, while the pistons 53 are connected or coupled with the unsuspended mass of the vehicle or respectively one wheel 55 and optionally, if present, also with a chassis axle 51. However, this can also be configured the other way around. Further, in the schematic representation of FIG. 6 usually additionally provided suspension elements, for example an air suspension element and/or a steel suspension element, have been omitted.

LIST OF REFERENCE NUMERALS 1 axle set, MPU axle set
1a axle set casing
11 MPU
11a MPU casing
12a casing lid
2 load, valve block
3 mounting flange on the valve block
4 fluid opening
5 screw holes
6 threaded holes
10 common electronic unit
10' electronic unit
10a electronic lid
20 motor-pump group
20a motor-pump casing
21 electric motor, electric motor generator
21a motor casing
22 pump
22a pump casing
23 mounting flange on the pump casing
24 fluid opening
25 threaded holes
26 threaded holes
40 O-ring
41 coupling adapter
42 fluid lines
42a coupling element, line end
42b mounting means
46 hydraulic lines
50 chassis system
51 chassis axle
52 pressure chamber
53 piston
54 shock absorber
55 wheel
56 pressure cylinder
57 piston rod
V1, V2 valve unit
V1a flap valve
V1b check valve
V2a pressure-limiting valve
V2b check valve
A1, A2 hydraulic fluid storage

The invention claimed is:

1. A hydraulic system for an active chassis, comprising a motor-pump group with a pump casing with a mounting section, on a front side, for attaching an external component with integrated fluid interface with first and second fluid openings;
a load with a casing with corresponding mounting section and corresponding fluid interface, wherein the load can be mounted on the pump casing in such a manner that respectively the first fluid openings of the two fluid interfaces and respectively the second fluid openings of the two fluid interfaces are disposed mutually opposite, the mounting sections of the motor-pump group and/or load are configured as planar flanges, and threaded holes and/or screw holes are integrated in the planar flanges.

2. The hydraulic system according to claim 1, further comprising:
coupling means for creating a hydraulic connection between respectively the first fluid openings and the second fluid openings, comprising at least one or exactly two O-rings, which are set up to be clamped between the mounting sections of the pump casing and the load when the load is attached on the pump casing, and/or at least one or exactly two coupling adapters each having two radial sealing rings, and/or two flexible fluid lines the line ends of which are provided for fluid-tight attachment on the fluid openings and have two radial sealing rings.

3. The hydraulic system according to claim 1, wherein a planar flange of the pump casing is configured normally to a motor shaft axis.

4. The hydraulic system according to claim 1, wherein the load is a valve block: is configured as a compact construction unit that comprises one regulating valve, one pressure-regulating valve, one check valve, one direction valve, and one flow divider.

5. The hydraulic system according to claim 1, wherein an electric motor or electric motor generator of the motor-pump group is a synchronous motor, and/or wherein a hydraulic pump of the motor-pump group is an internal-gear pump.

6. The hydraulic system according to claim 1, further comprising:
an electronic unit which is connected to the electric motor of the motor-pump group exactly or at least via three motor-phase lines or magnetic-coil supply lines, wherein the motor-pump group and the electronic unit are arranged in a common casing.

7. An axle set comprising a first and a second hydraulic system according to claim 1, with a common electronic unit, wherein the motor-pump groups and the common electronic unit are arranged in a common casing.

8. The axle set according to claim 7, wherein the first hydraulic system comprises as coupling means two O-rings or coupling adapters, and the second hydraulic system comprises as coupling means two fluid lines.

9. The axle set according to claim 7, wherein, in the first and second hydraulic systems respectively,
the load is mounted on the mounting section of the motor-pump group and coupling means in the form of two O-rings or
two coupling adapters create a hydraulic connection between the motor-pump group and the load, or
respectively the load is arranged remotely from the motor-pump group and coupling means in the form of two fluid lines create a hydraulic connection between the motor-pump group and the load, or
wherein in the first hydraulic system the load is mounted on the mounting section of the motor-pump group and coupling means in the form of two O-rings or
two coupling adapters create a hydraulic connection between the motor-pump group and the load, and in the second hydraulic system the load is arranged remotely from the motor-pump group and coupling means in the form of two fluid lines create a hydraulic connection between the motor-pump group and the load.

10. A construction kit comprising
a hydraulic system according to claim 1 and an axle set and two coupling means in the form of respectively two fluid lines.

11. The hydraulic system according to claim 1, wherein the load is mounted on the mounting section of the motor-pump group and coupling means in the form of two O-rings.

12. A chassis axle comprising two hydraulic systems according to claim 1, wherein the chassis axle is pre-assembled and/or has two controllable shock absorbers, which are hydraulically connected respectively with the two loads of the two hydraulic systems or of the axle set or respectively form the loads.

13. A chassis system for a vehicle, comprising at least a first and a second hydraulically controllable shock absorber, which are allocated to a common chassis axle, and a first and a second hydraulic system according to claim 1, wherein the load of the first hydraulic system hydraulically connects pressure chambers of the first shock absorber, and the load of the second hydraulic system hydraulically connects pressure chambers of the second shock absorber.

14. A chassis system for a vehicle, comprising at least a first and a second hydraulically controllable shock absorber, which are allocated to a common chassis axle, and a first and a second hydraulic system according to claim 1, wherein the motor-pump group of the first hydraulic system hydraulically connects pressure chambers of the first shock absorber, and the motor-pump group of the second hydraulic system hydraulically connects pressure chambers of the second shock absorber.

15. A chassis system for a vehicle, comprising at least a first and a second hydraulically controllable shock absorber, which are arranged on a common chassis axle, and a first and a second hydraulic system according to claim 1, wherein the motor-pump group of the first hydraulic system hydraulically connects pressure chambers of the first shock absorber, and the motor-pump group of the second hydraulic system hydraulically connects pressure chambers of the second shock absorber.

16. A chassis system for a vehicle, comprising at least a first and a second hydraulically controllable shock absorber, which are arranged on a common chassis axle, and a first and a second hydraulic system according to claim 1, wherein the load of the first hydraulic system hydraulically connects pressure chambers of the first shock absorber, and the load of the second hydraulic system hydraulically connects pressure chambers of the second shock absorber.

17. The hydraulic system according to claim 1, wherein two coupling adapters create a hydraulic connection between the motor-pump group and the load.

18. The hydraulic system according to claim 1, wherein the load is arranged remotely from the motor-pump group and coupling means in the form of two fluid lines create a hydraulic connection between the motor-pump group and the load.

19. An axle set comprising a first and a second hydraulic system according to claim 1, with a common electronic unit, wherein the motor-pump groups and the common electronic unit are screwed together.

20. An axle set comprising a first and a second hydraulic system according to claim 1, with a common electronic unit, wherein the motor-pump groups and the common electronic unit are mounted on a common mounting plate.

* * * * *